United States Patent
Li

(10) Patent No.: US 12,322,017 B2
(45) Date of Patent: Jun. 3, 2025

(54) METHOD AND APPARATUS FOR CONTROLLING VIRTUAL AVATAR, DEVICE, AND STORAGE MEDIUM

(71) Applicant: Beijing Zitiao Network Technology Co., Ltd., Beijing (CN)

(72) Inventor: Yitong Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/022,398

(22) PCT Filed: Oct. 24, 2022

(86) PCT No.: PCT/CN2022/126902
§ 371 (c)(1),
(2) Date: Feb. 21, 2023

(87) PCT Pub. No.: WO2023/202015
PCT Pub. Date: Oct. 26, 2023

(65) Prior Publication Data
US 2024/0265607 A1    Aug. 8, 2024

(30) Foreign Application Priority Data
Apr. 22, 2022    (CN) .......................... 202210465368.X

(51) Int. Cl.
*G06T 13/20*    (2011.01)
*G06F 3/01*    (2006.01)
*G06T 13/40*    (2011.01)

(52) U.S. Cl.
CPC .............. *G06T 13/40* (2013.01); *G06F 3/011* (2013.01)

(58) Field of Classification Search
CPC ........... G06T 13/20; G06T 13/40; G06T 7/70; G06T 2207/20044; G06T 17/00; G06T 19/20; G06T 2219/2016; G06F 3/011
See application file for complete search history.

(56) References Cited

U.S. PATENT DOCUMENTS

| | | | |
|---|---|---|---|
| 2001/0007452 A1* | 7/2001 | Naka ................ | H04N 21/23412 345/473 |
| 2013/0038601 A1* | 2/2013 | Han ........................ | G06F 3/011 345/473 |

(Continued)

FOREIGN PATENT DOCUMENTS

| | | |
|---|---|---|
| CN | 104517310 A | 4/2015 |
| CN | 107122043 A | 9/2017 |

(Continued)

OTHER PUBLICATIONS

International Search Report and Written Opinion, mailed on Jan. 19, 2023, International Patent Application No. PCT/CN2022/126902, International Filing Date Oct. 24, 2022. 9 pages.

(Continued)

*Primary Examiner* — Hau H Nguyen
(74) *Attorney, Agent, or Firm* — Astute IP Law Group

(57) ABSTRACT

A method for controlling a virtual avatar comprises: dividing a virtual avatar into a plurality of skeleton chains, wherein each of the plurality of skeleton chains comprises a plurality of skeleton points; acquiring state information of at least one control point and initial state information of at least one skeleton point, wherein the state information comprises location information and orientation information; determining movement information of at least one skeleton point based on the state information of the at least one control point and/or the initial state information of the at least one skeleton point, wherein the movement information comprises translation information and/or rotation information;

(Continued)

and controlling the at least one skeleton point whose movement information is determined to move according to the movement information.

18 Claims, 11 Drawing Sheets

(56) References Cited

U.S. PATENT DOCUMENTS

| 2015/0265361 | A1  | 9/2015 | Blau et al. |           |
|--------------|-----|--------|-------------|-----------|
| 2022/0241642 | A1* | 8/2022 | Halevy      | A61B 5/744 |

FOREIGN PATENT DOCUMENTS

| CN | 108876815 A | 11/2018 |
| CN | 110176062 A | 8/2019  |
| CN | 112686976 A | 4/2021  |

OTHER PUBLICATIONS

Aristidou et al., "Inverse Kinematics: a review of existing techniques and introduction of a new fast iterative solver", University of Cambridge Technical Report—Report No. CUED/F-INFENG/TR-632, Sep. 20, 2009, 74 pages.
Communication pursuant to Article 94(3)EPC for European Patent Application No. 22854452.4, mailed on Jan. 2, 2025, 5 pages.

* cited by examiner

METHOD AND APPARATUS FOR CONTROLLING VIRTUAL AVATAR, DEVICE, AND STORAGE MEDIUM

CROSS-REFERENCE TO RELATED APPLICATION(S)

This is a national stage application filed under 37 U.S.C. 371 based on International Patent Application No. PCT/CN2022/126902, filed Oct. 24, 2022, which claims priority to Chinese Patent Application No. 202210465368.X filed with the China National Intellectual Property Administration (CNIPA) on Apr. 22, 2022, the disclosures of which are incorporated herein by reference in its entirety.

TECHNICAL FIELD

The present disclosure relates to the field of computer technologies, for example, to a method and apparatus for controlling a virtual avatar, a device, and a storage medium.

BACKGROUND

With the rapid development of virtual reality (VR) technology, it has become a common leisure and entertainment way for users to experience the virtual world by wearing VR devices. Controlling a virtual avatar by wearing VR devices is one of the important application scenarios. In the related art, when the virtual avatar is controlled to move, the problem that the action of joints of the whole body of the virtual avatar is not natural exists.

SUMMARY

The present disclosure provides a method and apparatus for controlling a virtual avatar, a device, and a storage medium to control the actions of a virtual avatar, thereby ensuring that the actions of the virtual avatar are smooth and natural and basically consistent with the actual actions of a user.

In a first aspect, the present disclosure provides a method for controlling a virtual avatar. The method includes the steps described below.

A virtual avatar is divided into multiple skeleton chains, where each skeleton chain includes multiple skeleton points.

State information of at least one control point and initial state information of at least one skeleton point are acquired, where the state information includes location information and orientation information.

Movement information of at least one skeleton point is determined based on the state information of the at least one control point and/or the initial state information of the at least one skeleton point, where the movement information includes translation information and/or rotation information.

The at least one skeleton point whose movement information is determined is controlled to move according to the movement information.

In a second aspect, the present disclosure further provides an apparatus for controlling a virtual avatar. The apparatus includes a skeleton chain dividing module, a state information acquisition module, a movement information determination module, and a control module described below.

The skeleton chain dividing module is configured to divide a virtual avatar into multiple skeleton chains, where each skeleton chain includes multiple skeleton points.

The state information acquisition module is configured to acquire state information of at least one control point and initial state information of at least one skeleton point, where the state information includes location information and orientation information.

The movement information determination module is configured to determine movement information of at least one skeleton point based on the state information of the at least one control point and/or the initial state information of the at least one skeleton point, where the movement information includes translation information and/or rotation information.

The control module is configured to control the at least one skeleton point whose movement information is determined to move according to the movement information.

In a third aspect, the present disclosure further provides an electronic device. The electronic device includes one or more processing apparatuses and a memory.

The storage apparatus is configured to store one or more programs.

The one or more programs, when executed by the one or more processing apparatuses, cause the one or more processing apparatuses to perform the preceding method for controlling a virtual avatar.

In a fourth aspect, the present disclosure further provides a computer-readable medium storing a computer program, where the program, when executed by a processing apparatus, performs the preceding method for controlling a virtual avatar.

DETAILED DESCRIPTION

Figure 1:
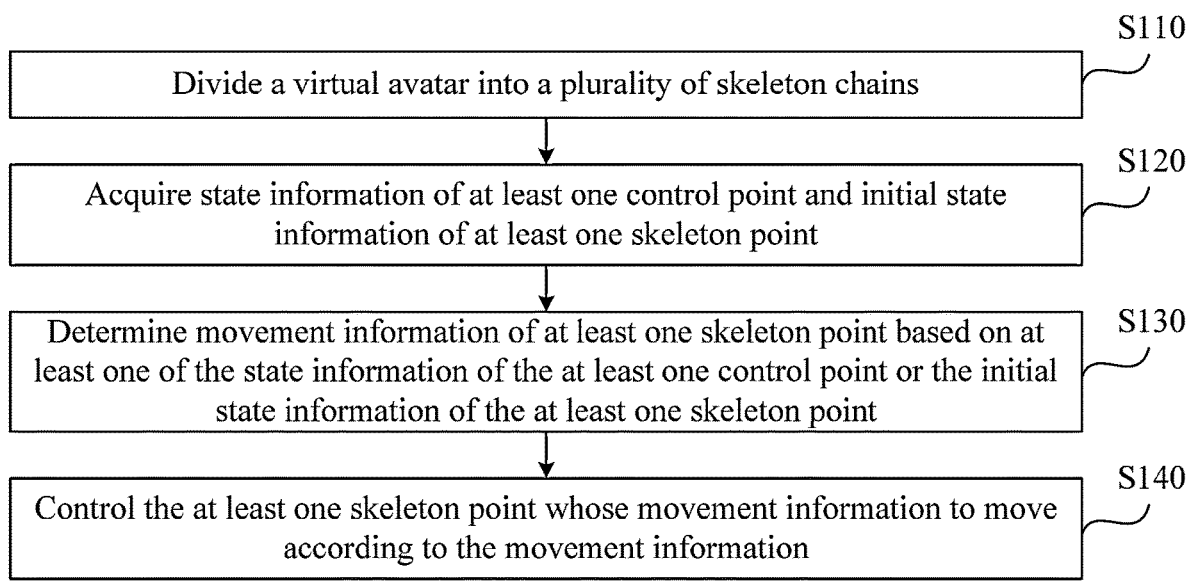
FIG. 1 is a flowchart of a method for controlling a virtual avatar according to an embodiment of the present disclosure.

Embodiments of the present disclosure will be described below with reference to the drawings. Although some embodiments of the present disclosure are illustrated in the drawings, the present disclosure may be embodied in various forms. Rather, these embodiments are provided so that the present disclosure will be understood. The drawings and embodiments of the present disclosure are for illustrative purposes.

The various steps recited in method embodiments of the present disclosure may be performed in a different order and/or in parallel. In addition, the method embodiments may include additional steps and/or omit performing illustrated steps. The scope of the present disclosure is not limited in this respect.

As used herein, the term "comprise" and variations thereof are intended to be open-ended terms, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

Concepts such as "first" and "second" in the present disclosure are intended to distinguish one apparatus, module or unit from another and are not intended to limit the order or interrelationship of the functions performed by the apparatus, module or unit.

References to modifications of "one" or "a plurality" mentioned in the present disclosure are intended to be illustrative and not limiting; those skilled in the art should understand that "one" or "a plurality" should be understood as "one or more" unless clearly stated in the context.

The names of messages or information exchanged between multiple apparatuses in the embodiments of the present disclosure are for illustrative purposes and are not intended to limit the scope of such messages or information.

FIG. 1 is a flowchart of a method for controlling a virtual avatar according to an embodiment of the present disclosure. This embodiment is applicable to the case of controlling the movement of the virtual avatar. The method may be executed by an apparatus for controlling a virtual avatar. The apparatus may be composed of hardware and/or software and generally integrated into a device having the function of controlling a virtual avatar. The device may be a server, a mobile terminal, a server cluster or other electronic devices. As shown in FIG. 1, the method includes the steps described below.

In S110, a virtual avatar is divided into multiple skeleton chains.

Each skeleton chain includes multiple skeleton points, that is, the skeleton chain may be a chain of multiple skeleton points and the skeleton points may be driven by one another to make the entire skeleton chain move. The virtual avatar may be a three-dimensional avatar constructed in a virtual scenario, such as a virtual three-dimensional character or a virtual three-dimensional animal.

Figure 2A:
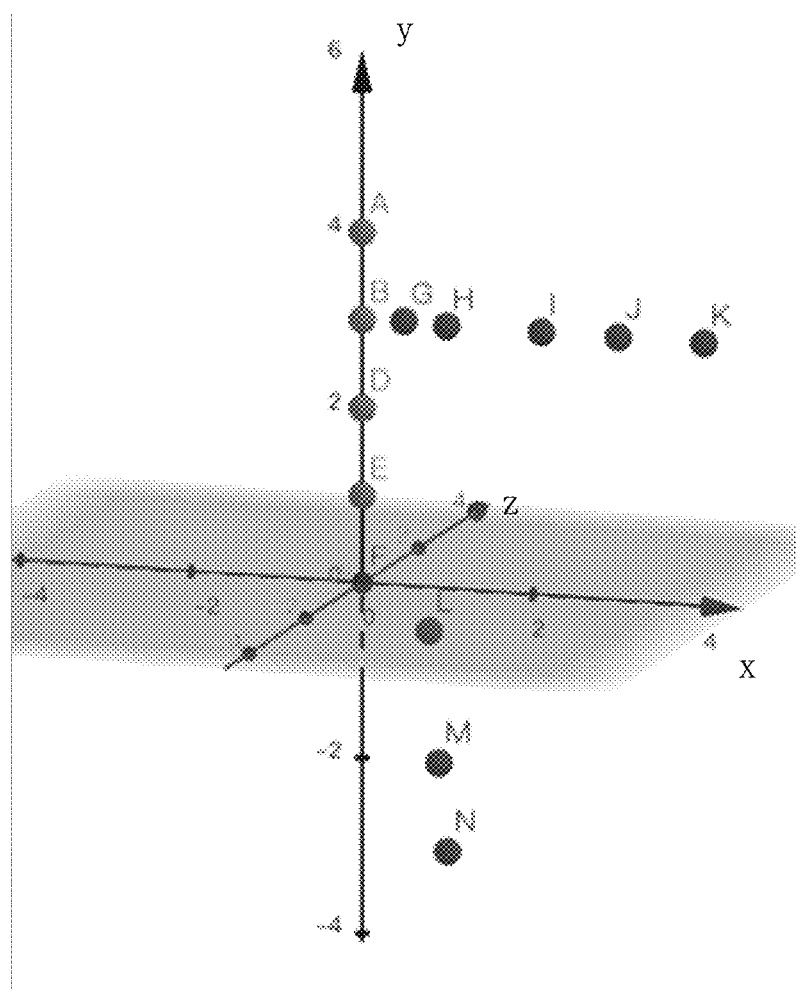
FIG. 2A is a schematic diagram of a half-body skeleton of a virtual avatar in an analog application according to an embodiment of the present disclosure.

In this embodiment, the entire skeleton of the virtual avatar is a tree structure and may be divided into a total of five skeleton chains, that is, a torso skeleton chain, two arm skeleton chains, and two leg skeleton chains. The torso skeleton chain includes a head skeleton point and multiple torso skeleton points. Each arm skeleton chain includes a shoulder skeleton point, an upper arm skeleton point, an elbow skeleton point, a forearm skeleton point, and a wrist skeleton point. Each leg skeleton chain includes a thigh skeleton point, a knee skeleton point, and an ankle skeleton point. For example, FIG. 2A is a schematic diagram of a half-body skeleton of a virtual avatar in an analog application according to an embodiment of the present disclosure. As shown in FIGS. 2A, A, B, D, E, and F are skeleton points on the torso skeleton chain, where A is the head skeleton point, and B, D, E, and F are the multiple torso skeleton points; G (shoulder skeleton point), H (upper arm skeleton point), I (elbow skeleton point), J (forearm skeleton point), and K (wrist skeleton point) are the right arm; L (thigh skeleton point), M (knee skeleton point), and N (ankle skeleton point) are the right leg. Like the right arm, the left arm also includes a shoulder skeleton point, an upper arm skeleton point, an elbow skeleton point, a forearm skeleton point, and a wrist skeleton point. Like the right leg, the left leg also includes a thigh skeleton point, a knee skeleton point, and an ankle skeleton point. In this embodiment, the skeleton of the virtual avatar is divided into multiple skeleton chains so that movement of each skeleton point on the skeleton chain can be accurately driven, thereby ensuring that the actions of the virtual avatar are smooth and natural.

In this embodiment, in order to accurately determine location information and orientation information of each skeleton point, a global coordinate system, and a local coordinate system of each skeleton point are required to be established. The orientation information of the skeleton point may be represented by directions of three coordinate axes of the local coordinate system of this skeleton point in the global coordinate system. The global coordinate system is constructed with a root skeleton point (F) as the origin, and as shown in FIG. 2A, the three axes in the figure are the X-axis, the Y-axis and the Z-axis of the global coordinate system, respectively. When the local coordinate system of each skeleton point is determined, the initial orientation of each skeleton point is determined on the basis of the standing state of the virtual avatar. As the skeleton point moves, the orientation of the local coordinate system also changes.

Figure 2B:
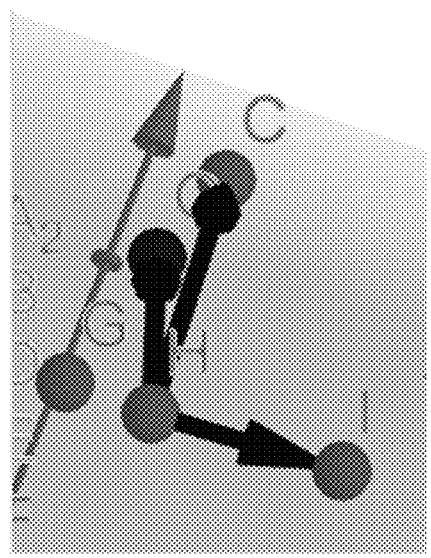
FIG. 2B is a schematic diagram of a local coordinate system of an upper arm skeleton point in an analog application according to an embodiment of the present disclosure.
Figure 2C:
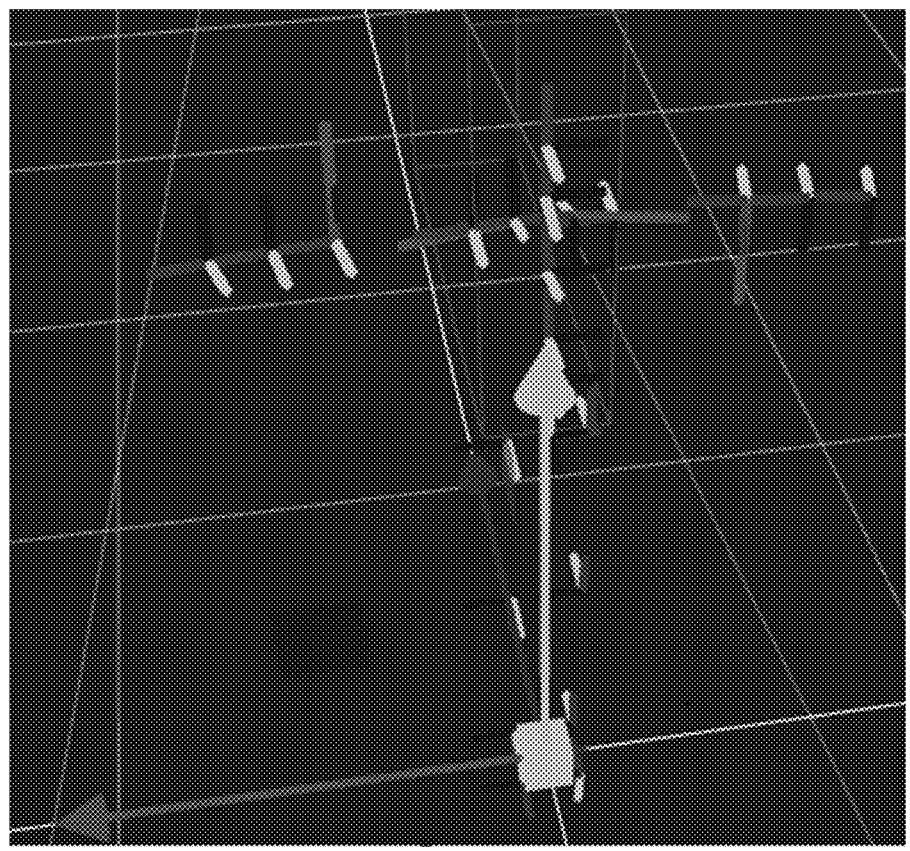
FIG. 2C is a schematic diagram of local coordinate systems of skeleton points of the whole body in an analog application according to an embodiment of the present disclosure.

For each skeleton point on the torso skeleton chain, the local coordinate system is constructed with the skeleton point as the origin and X, Y, and Z axes whose directions are the same as the directions of X, Y, and Z axes of the global coordinate system. For example, for the head skeleton point A, when the head rotates, the local coordinate system of the head skeleton point A rotates accordingly. For the skeleton points on limbs (that is, the skeleton points on the arm skeleton chains and leg skeleton chains), the skeleton point is the origin, the X-axis faces the sub-skeleton points of the skeleton point, the Y-axis faces the normal of the plane surface where the limbs are located, and the Z-axis is the cross-multiplication direction of the X-axis and the Y-axis. For example, FIG. 2B is a schematic diagram of a local coordinate system of an upper arm skeleton point in an analog application according to an embodiment of the present disclosure. As shown in FIG. 2B, for the arm skeleton chain GHIJK, the normal direction of the plane surface where the entire arm is located is determined according to the cross-multiplication of the direction vectors HI and IK. For the upper arm skeleton point H, the X-axis of its local coordinate system is the HI direction, the Y-axis is the normal direction of the plane surface, and the Z-axis is the cross-multiplication of the X-axis and the Y-axis. As the arm moves, the local coordinate system also changes (translates or rotates). For example, FIG. 2C is a schematic diagram of local coordinate systems of skeleton points of the whole body in an analog application according to an embodiment of the present disclosure.

In S120, state information of at least one control point and initial state information of at least one skeleton point are acquired.

The state information includes location information and orientation information. The location information may be the location of the skeleton point in the global coordinate system, and the orientation information may be determined by the three axis directions of the local coordinate system corresponding to the skeleton point. The control point includes at least one of: a hand control point or a head control point. In this application scenario, a VR device may include one head-mounted apparatus and two handles. The head-mounted apparatus corresponds to the head control point and is used for collecting state information of the head of a user in real time, and the handles correspond to hand control points and are used for collecting state information of the hands of the user in real time. In this embodiment, the state information of the head of the user may be used as the state information of the head skeleton point, and the state information of the hands may be used as the state information of the wrist skeleton points. The initial state information of the at least one skeleton point may be the state information of the at least one skeleton point in a previous frame.

In an embodiment, after the state information of the at least one control point and the initial state information of the at least one skeleton point are acquired, the virtual avatar is also required to be calibrated according to the state information of the control point and the initial state information of the at least one skeleton point, and then subsequent control is performed based on the calibrated virtual avatar.

In S130, movement information of at least one skeleton point is determined based on the state information of the at least one control point and/or the initial state information of the at least one skeleton point.

In S140, the at least one skeleton point whose movement information is determined is controlled to move according to the movement information.

The movement information includes translation information and/or rotation information. In this embodiment, each skeleton point has movement information of 6 degrees of freedom, that is, translation information of 3 degrees of freedom (translation amounts along three coordinate axes of the global coordinate system) and rotation information of 3 degrees of freedom (rotation amounts about three coordinate axes of the global coordinate system).

In this embodiment, the movement information of the at least one skeleton point is determined according to the skeleton chain in which each skeleton point is located. Movement information of the torso skeleton chain, the arm skeleton chains, and the leg skeleton chains is determined sequentially.

In an embodiment, for the multiple torso skeleton points, the motion information of the at least one skeleton point may be determined based on the state information of the at least one control point and/or the initial state information of the at least one skeleton point in the following manner: a target orientation of a chest skeleton point is determined according to state information of the hand control point and initial state information of the shoulder skeleton point; torso rotation information is determined according to the target orientation of the chest skeleton point and an initial orientation of the chest skeleton point; and first rotation information of the plurality of torso skeleton points is determined according to the torso rotation information.

Figure 3A:
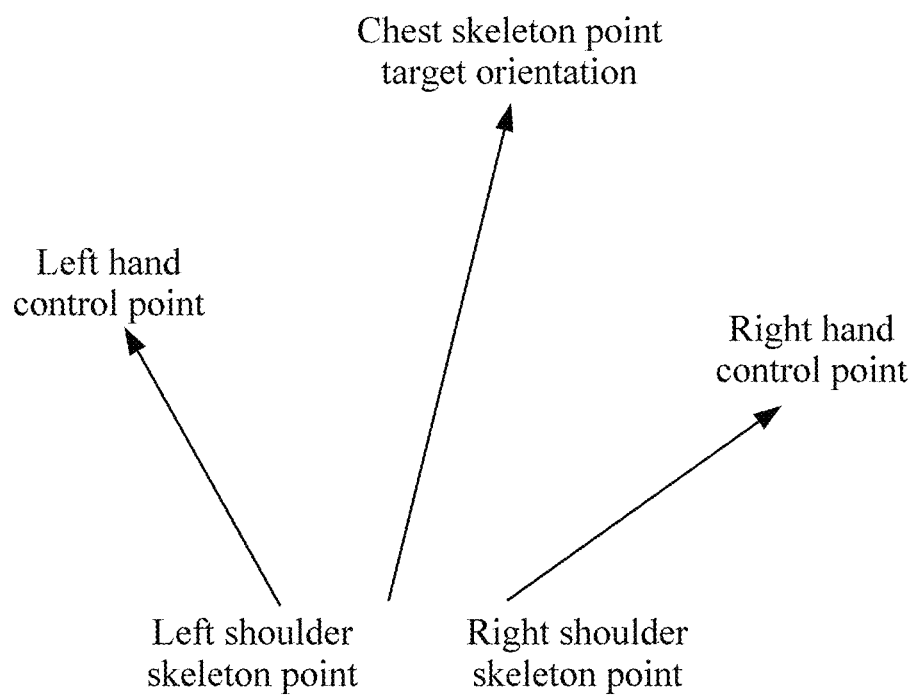
FIG. 3A is a schematic diagram of the determination of a target orientation of a chest skeleton point according to an embodiment of the present disclosure.

The first rotation information may be the rotation angles of the torso skeleton points about the Y-axis. For example, FIG. 3A is a schematic diagram of the determination of a target orientation of a chest skeleton point according to an embodiment of the present disclosure. As shown in FIG. 3A, directions (a direction from a left shoulder control point to a left hand control point, and a direction from a right shoulder control point to a right hand control point) from two shoulder skeleton points to the corresponding hand control points are determined according to the location information of the shoulder skeleton points and the location information of the hand control points, and the vectors corresponding to the two directions are added to obtain a direction vector corresponding to the target orientation of the chest skeleton point. The torso rotation information determined according to the target orientation of the chest skeleton point and the initial orientation of the chest skeleton point may be the rotation angle of the chest skeleton point about the Y-axis when the chest skeleton point rotates from the initial orientation to the target orientation. In this embodiment, the torso rotation information may be accurately determined.

In this embodiment, rotation amplitudes of different torso skeleton points may be the same or different. The first rotation information of the multiple torso skeleton points may be determined according to the torso rotation information in the following manner: a rotation ratio of each torso skeleton point is acquired, and first rotation information corresponding to each torso skeleton point is determined according to the rotation ratio and the torso rotation information.

The rotation ratio may be the same or may vary in such a manner as to decrease sequentially from top to bottom. If the rotation ratio of each torso skeleton point is the same, it indicates that the entire torso rotates through the same angle. If the rotation ratios vary in such a manner as to decrease sequentially from top to bottom, it indicates that the rotation amplitude of the upper torso is greater than the rotation amplitude of the lower torso. The first rotation information corresponding to each torso skeleton point may be determined according to the rotation ratio and the torso rotation information in the following manner: the torso rotation information is multiplied by each rotation ratio to obtain the first rotation information corresponding to each torso skeleton point. For example, assuming that the torso rotation information is 80 degrees and the rotation ratios of torso skeleton points B, D, E, and F are 100%, 80%, 50%, and 20% in sequence, the rotation angles of B, D, E, and F are 80 degrees, 64 degrees, 40 degrees, and 16 degrees in sequence. Accordingly, after the first rotation information corresponding to each torso skeleton point is determined, each torso skeleton point is controlled to rotate according to the first rotation information. In this embodiment, the rotation information of each torso skeleton point is determined according to the rotation ratio so that the virtual avatar can accurately simulate the rotation movement of the real human torso.

In an embodiment, for the head skeleton point, the motion information of at least one skeleton point may be determined based on the state information of the at least one control point and/or the initial state information of the at least one skeleton point in the following manner: movement information of the head skeleton point is determined based on state information of the head control point and initial state information of the head skeleton point.

Figure 3B:
FIG. 3B is a schematic diagram of the movement of a head in an analog application according to an embodiment of the present disclosure.

Translation information of the head skeleton point is determined according to location information of the head skeleton point and initial location information of the head skeleton point, and rotation information of the head skeleton point is determined according to orientation information of the head skeleton point and initial orientation information of the head skeleton point. Accordingly, the head skeleton point is controlled to translate according to the translation information and rotate according to the rotation information. For example, FIG. 3B is a schematic diagram of the movement of a head in an analog application according to an embodiment of the present disclosure. As shown in FIG. 3B, a schematic diagram of the nodding of an avatar is illustrated. In this embodiment, the multi-directional head movement of the virtual avatar, such as nodding, shaking, tilting, and the like, can be achieved by calculating the movement information of the head skeleton point.

In an embodiment, when the user is nodding, the movement of bowing occurs, and thus the virtual avatar is required to be controlled to perform the movement of bowing. After the head skeleton point is controlled to move according to the movement information of the head skeleton point, the method further includes the following steps: target location information of a moved head skeleton point and initial location information of a root skeleton point are acquired, and movement information of remaining torso skeleton points is determined using a first set algorithm based on the target location information and the initial location information.

The first set algorithm may be an inverse kinematics algorithm such as a forward and backward reaching inverse kinematics algorithm or a cyclic coordinate descent inverse kinematics algorithm. The movement information of the torso skeletal points B, D, and E is determined using the forward and backward reaching inverse kinematics algorithm or the cyclic coordinate descent inverse kinematics algorithm based on the location information of the moved head skeleton point A and the location information of the root skeleton point F. Accordingly, the remaining torso skeleton points (that is, skeleton points B, D, and E) are controlled to move according to the determined movement information, thereby driving the virtual avatar to perform the movement of bowing. In this embodiment, the movement information of the torso skeleton points is determined using the first set algorithm, thereby improving the calculation efficiency.

After the torso skeleton chain of the virtual avatar is controlled to move, the arm skeleton chains are controlled to move. Each arm skeleton chain includes five skeleton points, that is, the shoulder skeleton point G, the upper arm skeleton point H, the elbow skeleton point I, the forearm skeleton point J, and the wrist skeleton point K. The state information of the hand control point (handle) in the VR device is used as the target state information of the wrist skeleton point K, and the target state information of the remaining skeleton points on the arm skeleton chain is inversely calculated. Since the length of skeletons does not change, the location of each skeleton is determined by the rotation of its parent skeleton point. Therefore, the orientation information of the five arm skeleton points is required to be calculated. The orientation information is an orientation in the global coordinate system. Since the movement resolving of the torso skeleton chain has been performed before the movement information of the arm skeleton chain is calculated, that is, the torso skeleton chain has moved, the movement of the torso skeleton chain is required to be taken into account in the calculation of the movement of the arm. Therefore, the inverse transformation of the movement of the torso is required to be applied to the calculation of the current orientation. In this manner, the calculated movement of the skeleton point is the relative movement with respect to the current movement of the torso, and the calculated movement of the skeleton point is required to be superimposed with the movement of the torso to obtain the final result.

In an embodiment, for the shoulder skeleton point on the arm skeleton chain, the movement information of at least one skeleton point may be determined based on the state information of the at least one control point and/or the initial state information of the at least one skeleton point in the following manner: a target orientation of the shoulder skeleton point is determined based on location information of the hand control point and initial location information of the shoulder skeleton point.

The initial location information of the shoulder skeleton point may be the location information of the shoulder skeleton point after the torso moves. In this embodiment, in order to enable the wrist skeleton to reach the target location, the shoulder skeleton sometimes is required to slightly rotate, such as shrugging and chest lifting. The movement required for the shoulder skeleton point may be determined through the target location (that is, the location information of the hand control point) of the wrist skeleton point and the location information of the shoulder skeleton point. The target orientation may be the rotation angles of the shoulder skeleton point about three axes of the global coordinate system.

The process where the target orientation of the shoulder skeleton point is determined based on the location information of the hand control point and the initial location information of the shoulder skeleton point may be as follows: the vector formed by connecting the shoulder skeleton point and the hand control point is decomposed along three axes of the global coordinate system to obtain three components, and the rotation angles of the shoulder skeleton point about the three axes are determined based on the three components.

For example, assuming that the component along the X-axis is a, the component along the Y-axis is b and the component along the Z-axis is c, the rotation angle around the Y-axis is $\alpha=\arctan(c/a)$, the rotation angle around the X-axis is $\beta=\arctan(b/c)$, and the rotation angle around the Z-axis is $\arctan(a/b)$. Accordingly, after the target orientation of the shoulder control point is determined, the shoulder skeleton point is controlled to rotate to the target orientation. In this embodiment, the shoulder skeleton point is first controlled to slightly rotate so that the movement of the virtual avatar can be more natural.

In an embodiment, the process where the target orientation of the shoulder skeleton point is determined based on the location information of the hand control point and the initial location information of the shoulder skeleton point may be as follows: the vector from the hand control point to the shoulder skeleton point is projected onto three plane surfaces of the global coordinate system, and the rotation angles of the shoulder skeleton point about three axes of the global coordinate system are determined according to a projected line to obtain the target orientation.

Figure 4A:
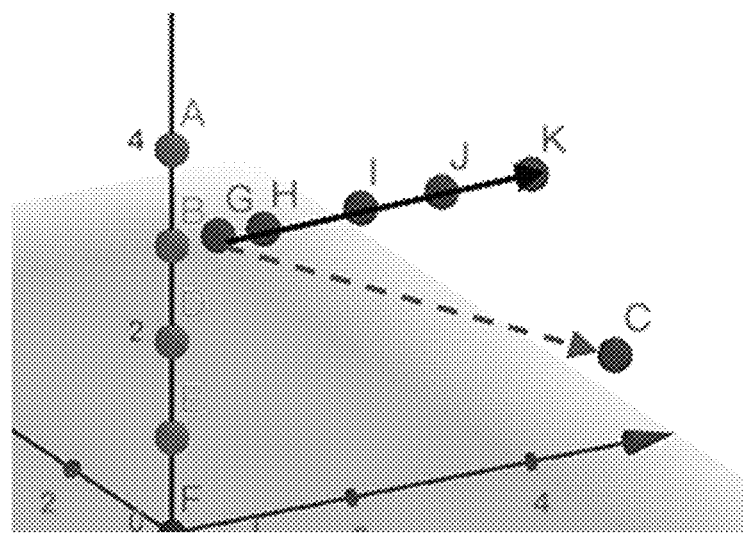
FIG. 4A is a schematic diagram of the movement of a hand skeleton in an analog application according to an embodiment of the present disclosure.
Figure 4B:
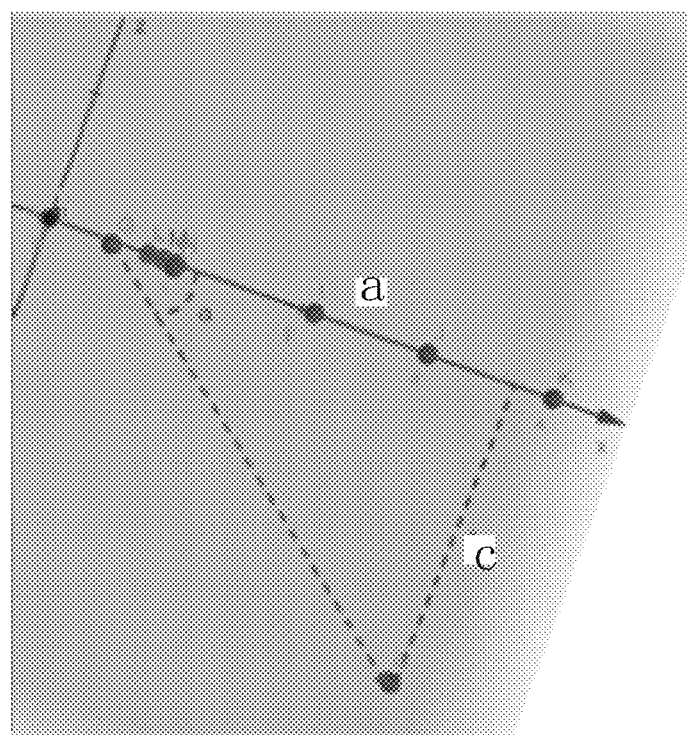
FIG. 4B is another schematic diagram of the movement of a hand skeleton in an analog application according to an embodiment of the present disclosure.

For example, FIG. 4A is a schematic diagram of the movement of a hand skeleton in an analog application according to an embodiment of the present disclosure, and FIG. 4B is another schematic diagram of the movement of a hand skeleton in an analog application according to an embodiment of the present disclosure. As shown in FIG. 4A, C is the hand control point, and the vector GC is the vector from the shoulder skeleton point to the hand control point. The vector GC is projected onto the XY plane surface, the XZ plane surface, and the YZ plane surface, respectively. As shown in FIG. 4B, the calculation is performed on the XZ plane surface using an example of the rotation around the Y-axis, and the target direction GC is decomposed in the X and Z directions to obtain an angle α=arctan(c/a). In this embodiment, the target orientation is determined by projecting the vector from the shoulder skeleton point to the hand control point onto three plane surfaces of the global coordinate system, thereby improving the accuracy.

In an embodiment, after the rotation angles of the shoulder skeleton point about three axes of the global coordinate system are determined according to the projected line, the method further includes the following steps: constraint information of the target orientation is acquired, and the target orientation is adjusted based on the constraint information to obtain an adjusted target orientation.

The constraint information may be preset, because the flexibility of the shoulder skeleton point is small and the rotation about the three axes is required to be constrained, respectively. In this embodiment, the constraint information of the rotation about the Y-axis is (−15, 30), the constraint information of the rotation about the X-axis is (−15, 15), and the constraint information of the rotation about the Z-axis is (0, 30). The target orientation may be adjusted based on the constraint information in the following manner: if the determined rotation angle exceeds the range corresponding to the constraint information, the rotation angle is adjusted to the range corresponding to the constraint information. For example, assuming that the determined rotation angle about the Y-axis is 35, the rotation angle about the Y-axis is adjusted to 30. In this embodiment, the target orientation is adjusted based on the constraint information so that the movement of the shoulder skeleton point is prevented from being unnatural due to the large rotation of the shoulder skeleton point.

In an embodiment, after the rotation angles of the shoulder skeleton point about three axes of the global coordinate system are determined according to the projected line, the method further includes the following step: if the rotation angle exceeds a set value, the rotation angle is multiplied by a length of the projected vector to obtain a corrected rotation angle.

In this embodiment, the target orientation is almost parallel to a certain coordinate axis. With the Y-axis as an example, the two projected points C and G are almost overlapped with each other on the XZ plane surface so that the projection component of the vector GC on the X-axis and the Z-axis is very small. At this point, the rotation angle calculated in the preceding manner exceeds the set value, that is, the calculated rotation angle causes large jitters due to a small fluctuation of data. At this point, the corrected rotation angle may be obtained by multiplying the rotation angle by the length of the projected vector. In this embodiment, the rotation angle is corrected so that the smooth treatment of the rotation angle is achieved, thereby avoiding the violent rotation caused by the small data.

After the upper arm skeleton point rotates, the movement information of the upper arm and the elbow is calculated. In an embodiment, after the shoulder skeleton point is controlled to rotate to the target orientation, the method further includes the following steps: target plane surface information of an arm is determined, a target location of the elbow skeleton point is determined using a second set algorithm based on the target plane surface information, initial location information of the upper arm skeleton point, and the location information of the hand control point, and the elbow skeleton point is controlled to move to the target location.

The target plane surface information of the arm may be the information of the plane surface where the arm is located after the wrist skeleton point moves to the location information of the hand control point, and may be represented by normal information, that is, by a normal vector of the plane surface where the arm is located. The second set algorithm may be an inverse kinematics algorithm such as a triangular transformation inverse kinematics algorithm. The principle of the preceding algorithm is to solve the movement resolving problem of three skeleton points (the upper arm skeleton point, the elbow skeleton point, and the wrist skeleton point) based on the law of cosines.

Figure 4C:
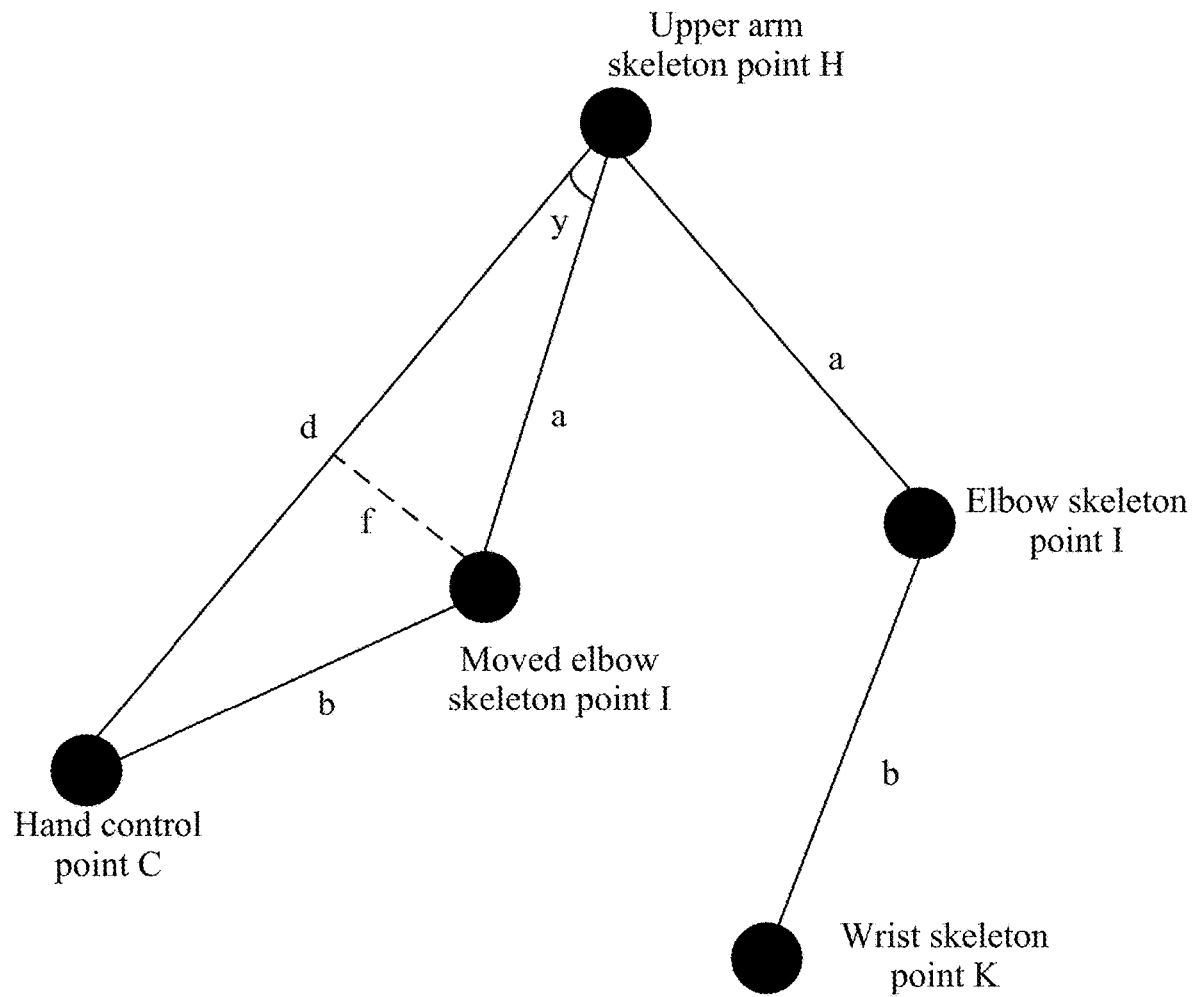
FIG. 4C is a schematic diagram of the determination of a location of an elbow skeleton point according to an embodiment of the present disclosure.

For example, FIG. 4C is a schematic diagram of the determination of a location of an elbow skeleton point. As shown in FIG. 4C, when the arm moves, since the arm length between the upper arm skeleton point and the elbow skeleton point and the arm length between the elbow skeleton point and the wrist skeleton point are kept unchanged, the included angle y may be obtained through the law of cosines, that is, $\cos y=(a^2+d^2-b^2)/(2*a*d)$, the distance from the moved elbow skeleton point I to HC is $f=a*\sin y$, and the projection distance of HI on HC is $p=a*\cos y$. The new location of the elbow skeleton is denoted as: OutJointPos=RootPos+p*HC+f*bendNormal. In the preceding formula, RootPos is the location information of the upper arm skeleton point, HC is the vector from the upper arm skeleton point H to the hand control point C, and bendNormal is the normal information of the arm plane surface. In this embodiment, the target location information of the elbow skeleton point is determined based on the second set algorithm, thereby improving the calculation efficiency.

In this embodiment, since OutJointPos has a myriad of solutions in a three-dimensional space, bendNormal is needed to be determined.

In an embodiment, the target plane surface information of the arm may be determined by using a lookup table method. The orientations of bendNormal in several designated locations are pre-designated. For example, bendNormal faces upward when the arm is raised flat, bendNormal faces obliquely upward by 45 degrees when the hand is placed in front of the chest, and bendNormal faces forward when the arm is raised upward. After 5 to 6 preset orientations are designated, the orientations of the wrist in the remaining locations are determined based on these preset location interpolations.

In an embodiment, the target plane surface information of the arm may be determined in the following manner: an elbow target orientation is determined according to a first upper arm direction, a second upper arm direction, an elbow initial orientation, and an orientation of the hand control point, and the target plane surface information of the arm is determined according to the elbow target orientation and the second upper arm direction.

The first upper arm direction may be the direction in which the upper arm skeletal point points toward the wrist skeleton point before the wrist skeleton point moves, that is, the vector HK. The second upper arm direction may be the direction in which the upper arm skeleton point points toward the moved wrist skeleton point (that is, the hand control point), that is, the vector HC. The elbow initial orientation is determined by the local coordinate system of the elbow skeleton point before the elbow skeleton point moves.

In this embodiment, the process where the elbow target orientation is determined according to the first upper arm direction, the second upper arm direction, the elbow initial orientation, and the orientation of the hand control point may be as follows: a rotation angle from the first upper arm direction to the second upper arm direction is acquired, an elbow intermediate orientation is determined based on the rotation angle and the elbow initial orientation, and the elbow target orientation is determined based on the elbow intermediate orientation and the orientation of the hand control point.

Figure 5A:
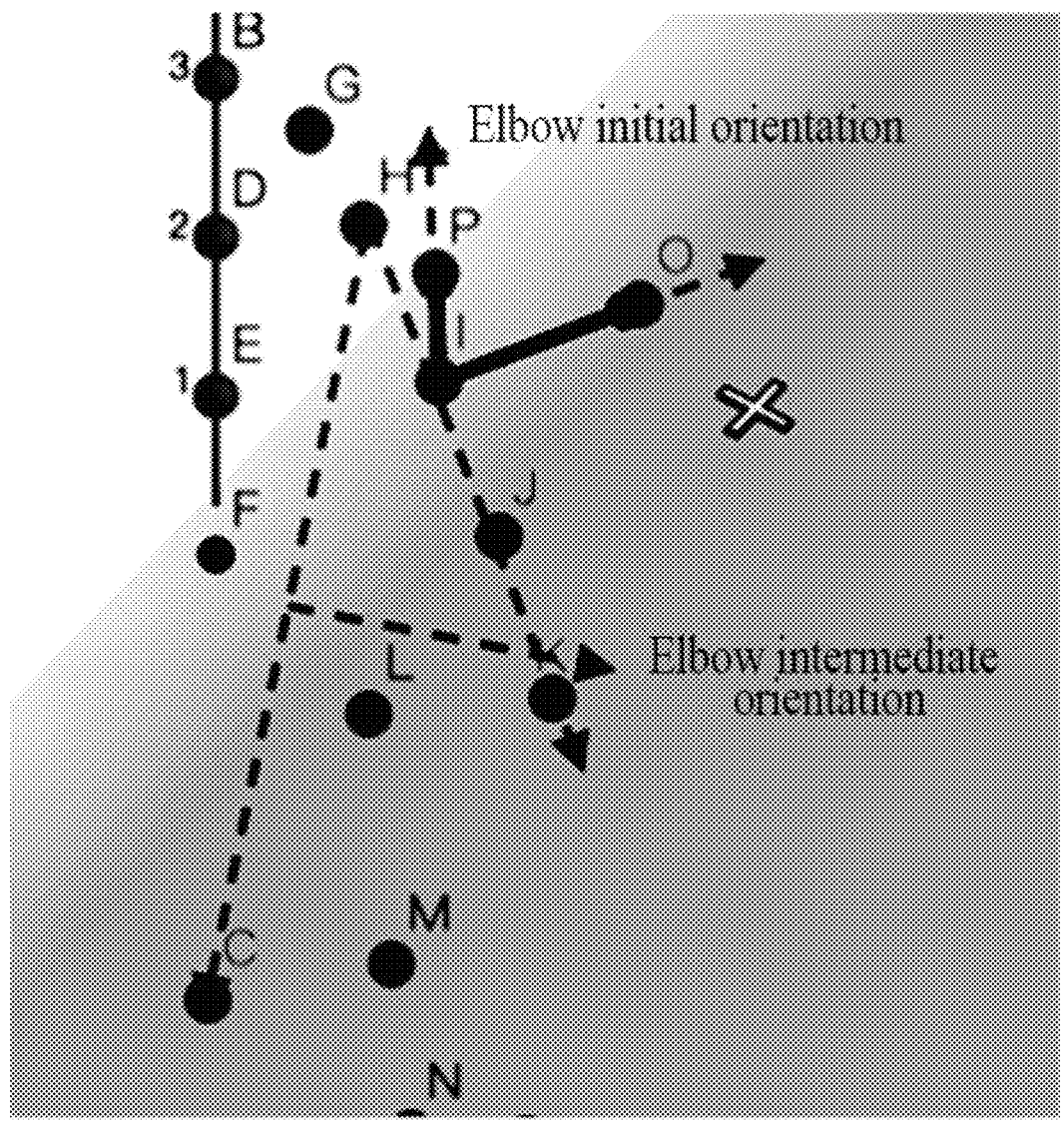
FIG. 5A is a schematic diagram of the determination of plane surface information of an arm in an analog application according to an embodiment of the present disclosure.
Figure 5B:
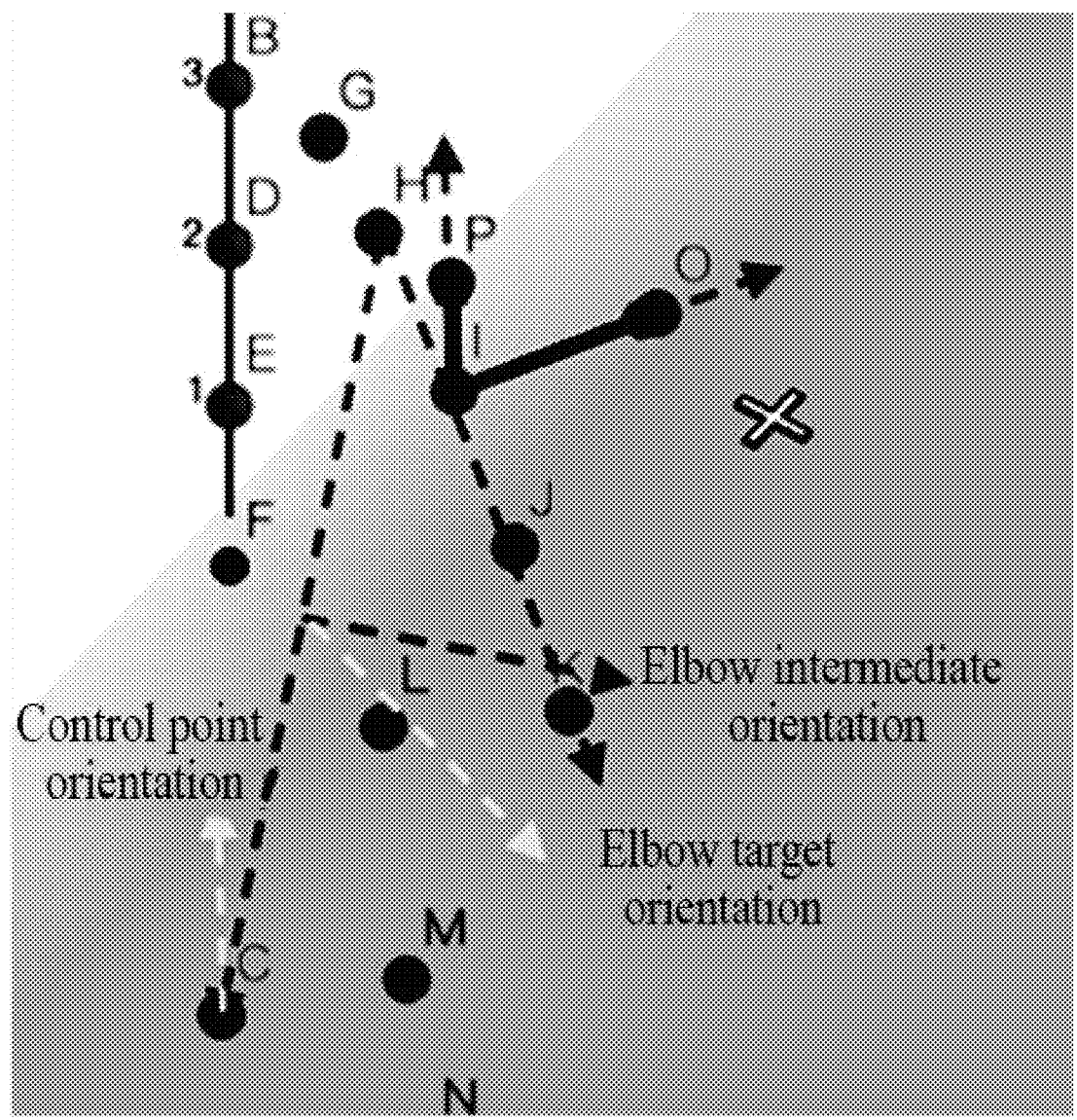
FIG. 5B is another schematic diagram of the determination of plane surface information of an arm in an analog application according to an embodiment of the present disclosure.
Figure 5C:
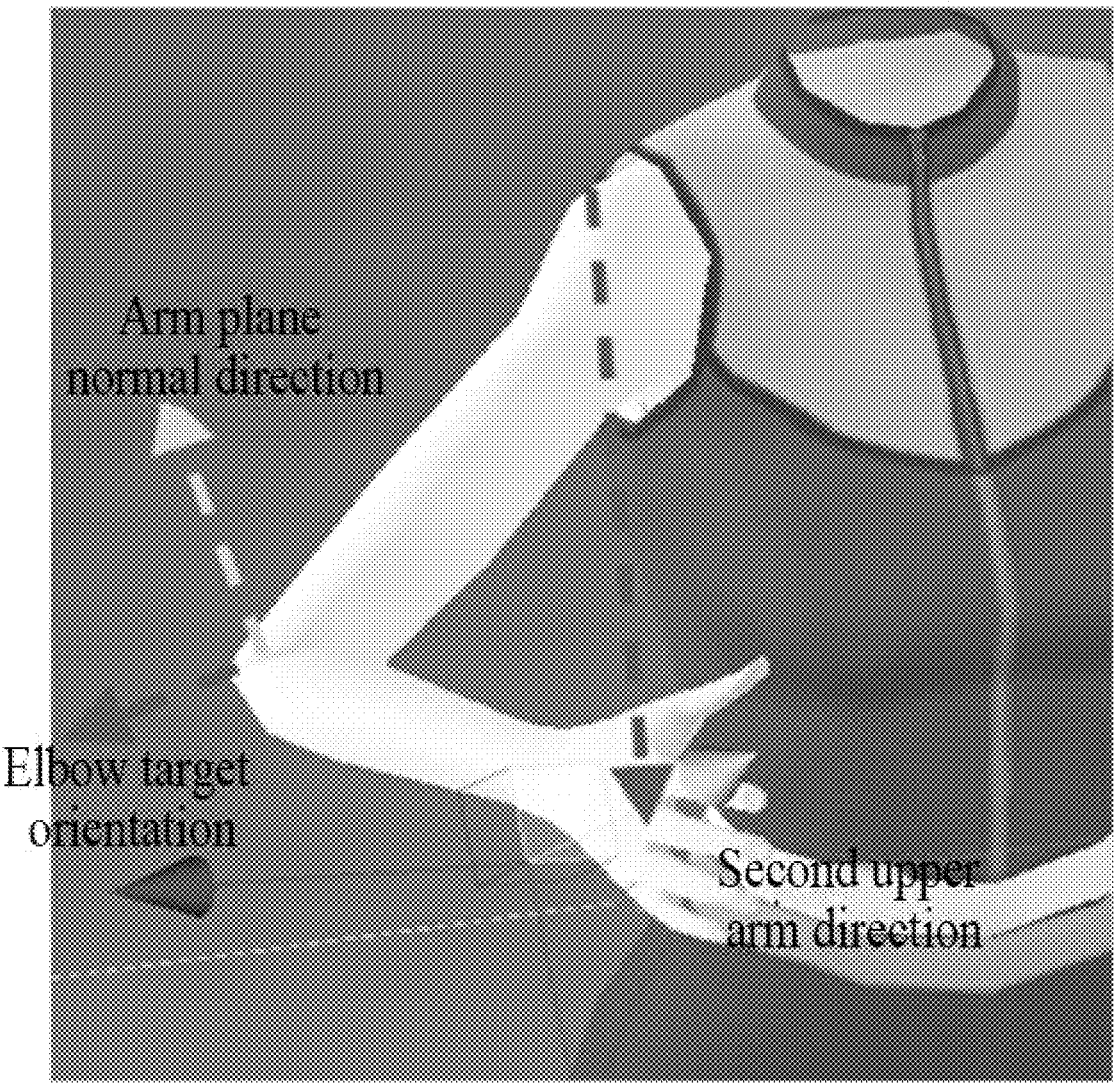
FIG. 5C is another schematic diagram of the determination of plane surface information of an arm in an analog application according to an embodiment of the present disclosure.

For example, FIG. 5A is a schematic diagram of the determination of plane surface information of an arm in an analog application according to an embodiment of the present disclosure, FIG. 5B is another schematic diagram of the determination of plane surface information of an arm in an analog application according to an embodiment of the present disclosure, and FIG. 5C is another schematic diagram of the determination of plane surface information of an arm in an analog application according to an embodiment of the present disclosure. After the rotation angle from the vector HK to the vector HC is determined, the elbow skeleton point is controlled to rotate at the same angle to obtain the elbow intermediate orientation, as shown in FIG. 5A. The elbow intermediate orientation is subtracted from the orientation of the hand control point to obtain the elbow target orientation so that the elbow rotates in the reverse direction of the wrist, and the elbow orientation is more in line with the law of the natural human body movement, as shown in FIG. 5B. After the elbow target orientation is determined, the elbow target orientation is cross-multiplied by in the second upper arm direction to obtain the normal information of the target plane surface, as shown in FIG. 5C. In the scheme of this embodiment, the resolved arm movement is more in line with the law of the natural human body movement.

In this embodiment, after the elbow skeleton point is controlled to move to the target location, the wrist is required to be controlled to rotate to the target orientation. In an embodiment, after the elbow skeleton point is controlled to move to the target location, the method further includes the following steps: first orientation information of a moved wrist skeleton point is acquired, second rotation information is determined according to the first orientation information and orientation information of the hand control point, and the elbow skeleton point, the forearm skeleton point, and the wrist skeleton point are controlled to rotate according to the second rotation information.

The first orientation information is determined by the local coordinate system of the wrist skeleton point after the wrist skeleton point moves. The orientation information of the hand control point may be the target orientation information of the wrist skeleton point. In this embodiment, in order to avoid the distortion and abnormal effect of the skin caused by the rotation of a single skeleton point, the rotation is required to be dispersed to 2 to 3 skeleton points, that is, the second rotation information is required to be dispersed to the elbow skeleton point, the forearm skeleton point, and the wrist skeleton point. In this embodiment, the coherent and natural action of the arm may be restored according to the movement of the arm control point.

The process where the elbow skeleton point, the forearm skeleton point, and the wrist skeleton point are controlled to rotate according to the second rotation information may be as follows: swing-twist decomposition is performed on the second rotation information to obtain a swing component and a twist component, the twist component is assigned to the elbow skeleton point, the forearm skeleton point, and the wrist skeleton point in predetermined ratios, the swing component is assigned to the wrist skeleton point, the elbow skeleton point and the forearm skeleton point are controlled to rotate according to an assigned twist component, and the wrist skeleton point is controlled to rotate according to the assigned twist component and an assigned swing component.

Figure 6:
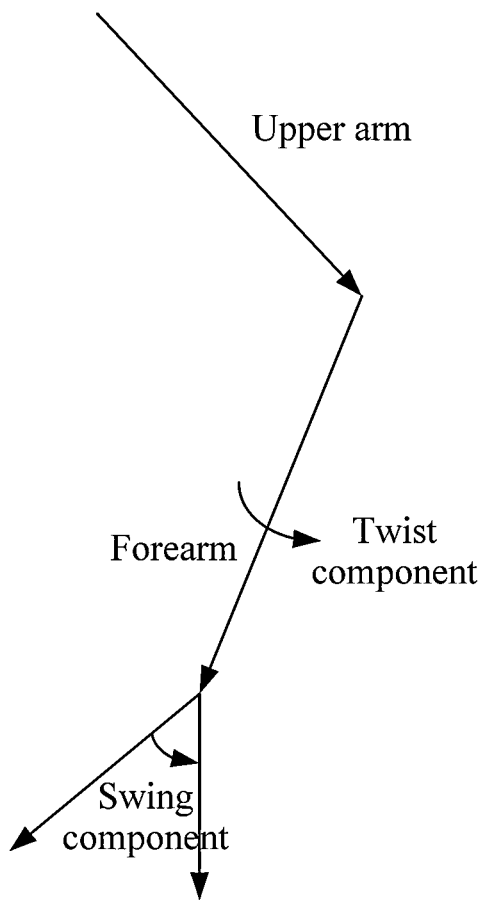
FIG. 6 is a schematic diagram of the swing-twist decomposition on the rotation of a forearm according to an embodiment of the present disclosure.

The swing-twist decomposition may be performed on the second rotation information in any existing manner, and the manner is not limited herein. For example, FIG. 6 is a schematic diagram of the swing-twist decomposition on the rotation of a forearm according to an embodiment of the present disclosure. As shown in FIG. 6, the third selection information may be decomposed into a twist component twisting around the forearm and a swing component swinging around the forearm. The twist component was split at a certain ratio and dispersed to three skeleton points, that is, the elbow skeleton point, the forearm skeleton point, and the wrist skeleton point. That is, the twist component was split into twist1, twist2, and twist3. The swing component is all applied to the wrist skeleton point. The final rotation of the wrist skeleton point is twist3*swing. In the scheme of this embodiment, the wrist of the virtual avatar may orient in any direction, and no "twisting" phenomenon occurs on the skin.

In an embodiment, for the leg skeleton chain, the movement information of at least one skeleton point may be determined based on the state information of the at least one control point and/or the initial state information of the at least one skeleton point in the following manner: a movement mode of the virtual avatar is determined according to location information of the head control point; if the movement mode of the virtual avatar is walking, a moving direction and a moving speed of the virtual avatar are determined; initial movement information of each of multiple skeleton points on the leg skeleton chain in a set animation is acquired according to the moving direction, and the initial movement information is adjusted based on the moving speed to obtain target movement information.

The movement mode of the virtual avatar may be walking, jumping or squatting. The set animation may include an animation standing in place and animations walking in four directions (front, back, left, and right). The set animation stores the initial movement information of the skeleton points on the leg skeleton chain in every frame. The initial movement information may be adjusted based on the moving speed in the following manner: the two-leg moving speed in the set animation is acquired, a ratio of the two-leg moving speed in the set animation to the moving speed of the virtual avatar is determined, and the initial movement information per frame is adjusted based on the ratio to obtain the target movement information.

The corresponding animation is determined according to the moving direction, the initial movement information of each skeleton point on the leg skeleton chain in each frame of the animation is extracted, and the initial movement information is adjusted based on the moving speed of the virtual avatar to obtain the target movement information. Accordingly, the each skeleton point on the leg skeleton chain is controlled to move according to the target movement information.

In this embodiment, in order to avoid the animation jitter caused by the data fluctuation, the set animation is acquired using an interval sampling method, for example, the set animation is updated 5 times per second, and the speed is smoothed to avoid the frequent switching of the animation.

In an embodiment, if the movement mode of the virtual avatar is jumping or squatting, target location information of the thigh skeleton point and target location information of the ankle skeleton point are determined, and target location information of the knee skeleton point is determined using a third set algorithm based on the target location information of the thigh skeleton point and the target location information of the ankle skeleton point. Accordingly, the knee skeleton point is controlled to move to a target location.

The third set algorithm may be an inverse kinematics algorithm such as a triangular transformation inverse kinematics algorithm. The principle of the preceding algorithm is to solve the movement resolving problem of three skeleton points (the thigh skeleton point, the knee skeleton point, and the ankle skeleton point) based on the law of cosines. For the implementation, reference may be made to the determination of the target location information of the elbow skeleton point, and details will not be repeated herein. In this embodiment, the normal information of the leg plane surface may be consistent with the normal information in the set animation. If the movement mode is squatting, the target location information of the ankle skeleton point is determined according to the ground height. In this embodiment, the control of the action of the leg of the virtual avatar is achieved.

In an embodiment, if the state information of the control point is detected not to change when the set duration is exceeded (for example, 30 seconds), the virtual character is controlled to move according to the preset animation. For example, in some application scenarios, the user places the handle on the table or elsewhere and only wears a helmet. In order to avoid the phenomenon that the posture of the virtual avatar becomes weird due to the strange location where the handle is placed, the handle static determination is added. When the handle remains stationary for a long time, it is determined that the user does not hold the handle, and at this point, the driving calculation of the hand control point is slowly stopped, and the arm of the virtual avatar gradually transitions to the movement state of the preset animation.

In an application scenario of this embodiment, the user wears a VR device, where the VR device includes one head-mounted apparatus and two handles, and the head-mounted apparatus and the handles are equipped with multiple sensors (for example, location sensors, gyroscopes, and the like). The head-mounted apparatus may collect the state information (that is, the location and the orientation) of the head of the user in real time, and the handles may collect the state information (that is, the location and the orientation) of each of the hands in real time. Based on the schemes of the preceding embodiments, the movement information of the skeleton points on the five skeleton chains of the virtual avatar is resolved based on the three pieces of state information to obtain the translation amount and the rotation amount of each skeleton point so that each skeleton point is controlled to move according to the translation amount and the rotation amount, thereby achieving the effect that the actions of the virtual avatar are basically consistent with the actual actions of the user and achieving the accurate control of the virtual avatar.

In the schemes of the embodiments of the present disclosure, a virtual avatar is divided into multiple skeleton chains, where each skeleton chain includes multiple skeleton points; state information of at least one control point and initial state information of at least one skeleton point are acquired, where the state information includes location information and orientation information; movement information of at least one skeleton point is determined based on the state information of the at least one control point and/or the initial state information of the at least one skeleton point, where the movement information includes translation information and/or rotation information; and the at least one skeleton point whose movement information is determined is controlled to move according to the movement information. Through the method for controlling a virtual avatar provided in the embodiments of the present disclosure, the actions of the virtual avatar are controlled, thereby ensuring that the actions of the virtual avatar are smooth and natural and basically consistent with the actual actions of the user.

Figure 7:
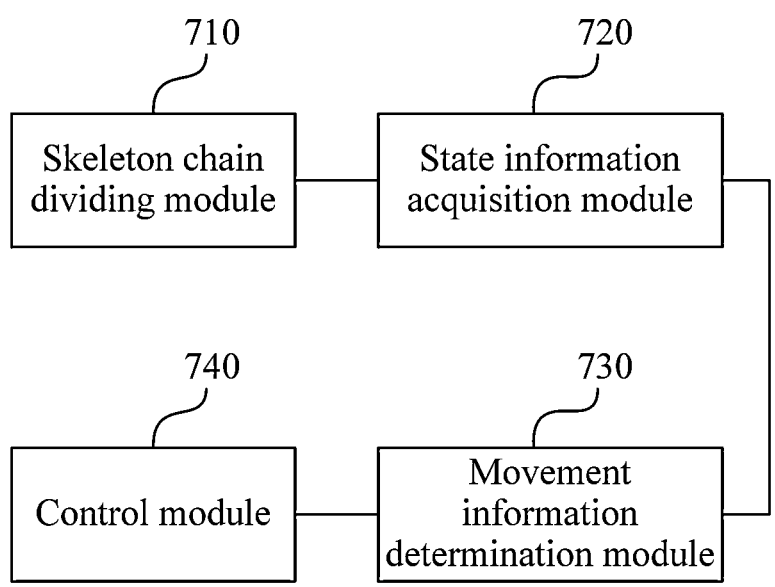
FIG. 7 is a structure diagram of an apparatus for controlling a virtual avatar according to an embodiment of the present disclosure.

FIG. 7 is a structure diagram of an apparatus for controlling a virtual avatar according to an embodiment of the present disclosure. As shown in FIG. 7, the apparatus includes: a skeleton chain dividing module 710, a state information acquisition module 720, a movement information determination module 730, and a control module 740 described below.

The skeleton chain dividing module 710 is configured to divide a virtual avatar into multiple skeleton chains, where each skeleton chain includes multiple skeleton points. The state information acquisition module 720 is configured to acquire state information of at least one control point and initial state information of at least one skeleton point, where the state information includes location information and orientation information. The movement information determination module 730 is configured to determine movement information of at least one skeleton point based on the state information of the at least one control point and/or the initial state information of the at least one skeleton point, where the movement information includes translation information and/or rotation information. The control module 740 is configured to control the at least one skeleton point whose movement information is determined to move according to the movement information.

In an embodiment, the multiple skeleton chains include a torso skeleton chain, two arm skeleton chains, and two leg skeleton chains, where the torso skeleton chain includes a head skeleton point and multiple torso skeleton points, each arm skeleton chain includes a shoulder skeleton point, an upper arm skeleton point, an elbow skeleton point, a forearm skeleton point, and a wrist skeleton point, and each leg skeleton chain includes a thigh skeleton point, a knee skeleton point, and an ankle skeleton point; and the at least one control point includes at least one of: a hand control point or a head control point.

In an embodiment, for the multiple torso skeleton points, the movement information determination module 730 is further configured to: determine a target orientation of a chest skeleton point according to state information of the hand control point and initial state information of the shoulder skeleton point; determine torso rotation information according to the target orientation of the chest skeleton point and an initial orientation of the chest skeleton point; and determine first rotation information of the multiple torso skeleton points according to the torso rotation information.

In an embodiment, the movement information determination module 730 is further configured to: acquire a rotation ratio of each torso skeleton point; and determine first rotation information corresponding to each torso skeleton point according to the rotation ratio and the torso rotation information.

In an embodiment, the control module 740 is further configured to: control each torso skeleton point to rotate according to the first rotation information.

In an embodiment, for the head skeleton point, the movement information determination module 730 is further configured to: determine movement information of the head skeleton point based on state information of the head control point and initial state information of the head skeleton point.

In an embodiment, the control module 740 is further configured to: control the head skeleton point to move according to the movement information of the head skeleton point.

In an embodiment, the movement information determination module 730 is further configured to: acquire target location information of a moved head skeleton point and initial location information of a root skeleton point; and determine movement information of remaining torso skeleton points using a first set algorithm based on the target location information and the initial location information.

In an embodiment, the control module 740 is further configured to: control the remaining torso skeleton points to move according to the movement information.

In an embodiment, for the shoulder skeleton point on the arm skeleton chain, the movement information determination module 730 is further configured to: determine a target orientation of the shoulder skeleton point based on location information of the hand control point and initial location information of the shoulder skeleton point.

In an embodiment, the control module 740 is further configured to: control the shoulder skeleton point to rotate to the target orientation.

In an embodiment, the movement information determination module 730 is further configured to: project the vector from the shoulder skeleton point to the hand control point onto the three plane surfaces of the global coordinate system; and determine rotation angles of the shoulder skeleton point about three axes of the global coordinate system according to a projected vector to obtain the target orientation.

In an embodiment, the movement information determination module 730 is further configured to: acquire constraint information of the target orientation; and adjust the target orientation based on the constraint information to obtain an adjusted target orientation.

In an embodiment, the movement information determination module 730 is further configured to: if the rotation angle exceeds a set value, multiply the rotation angle by a length of the projected vector to obtain a corrected rotation angle.

In an embodiment, the movement information determination module 730 is further configured to: determine target plane surface information of an arm; and determine target location of the elbow skeleton point using a second set algorithm based on the target plane surface information, initial location information of the upper arm skeleton point, and the location information of the hand control point; and control the elbow skeleton point to move to a target location.

In an embodiment, the movement information determination module 730 is further configured to: determine an elbow target orientation according to a first upper arm direction, a second upper arm direction, an elbow initial orientation, and an orientation of the hand control point; and determine the target plane surface information of the arm according to the elbow target orientation and the second upper arm direction.

In an embodiment, the movement information determination module 730 is further configured to: acquire a rotation angle from the first upper arm direction to the second upper arm direction; determine an elbow intermediate orientation based on the rotation angle and the elbow initial orientation; and determine the elbow target orientation based on the elbow intermediate orientation and the orientation of the hand control point.

In an embodiment, the movement information determination module 730 is further configured to: acquire first orientation information of a moved wrist skeleton point; determine second rotation information according to the first orientation information and orientation information of the hand control point; and control the elbow skeleton point, the forearm skeleton point, and the wrist skeleton point to rotate according to the second rotation information.

In an embodiment, the movement information determination module 730 is further configured to: perform swing-twist decomposition on the second rotation information to obtain a swing component and a twist component; assign the twist component to the elbow skeleton point, the forearm skeleton point, and the wrist skeleton point in predetermined ratios, and assign the swing component to the wrist skeleton point; and control the elbow skeleton point and the forearm skeleton point to rotate according to an assigned twist component, and control the wrist skeleton point to rotate according to the assigned twist component and an assigned swing component.

In an embodiment, for the leg skeleton point, the movement information determination module 730 is further configured to: determine a movement mode of the virtual avatar according to location information of the head control point; if the movement mode of the virtual avatar is walking, determine a moving direction and a moving speed of the virtual avatar; acquire initial movement information of each of multiple skeleton points on the leg skeleton chain in a set animation according to the moving direction; and adjust the initial movement information based on the moving speed to obtain target movement information.

In an embodiment, the control module 740 is further configured to: control the each skeleton point on the leg skeleton chain to move according to the target movement information.

In an embodiment, the movement information determination module 730 is further configured to: if the movement mode of the virtual avatar is jumping or squatting, determine target location information of the thigh skeleton point and target location information of the ankle skeleton point; and determine target location information of the knee skeleton point using a third set algorithm based on the target location information of the thigh skeleton point and the target location information of the ankle skeleton point.

In an embodiment, the control module 740 is further configured to: control the knee skeleton point to move to a target location.

The preceding apparatus can execute the methods provided in all embodiments of the present disclosure and has functional modules and effects corresponding to the executed methods. For technical details not described in detail in this embodiment, reference may be made to the methods provided in all embodiments of the present disclosure.

Figure 8:
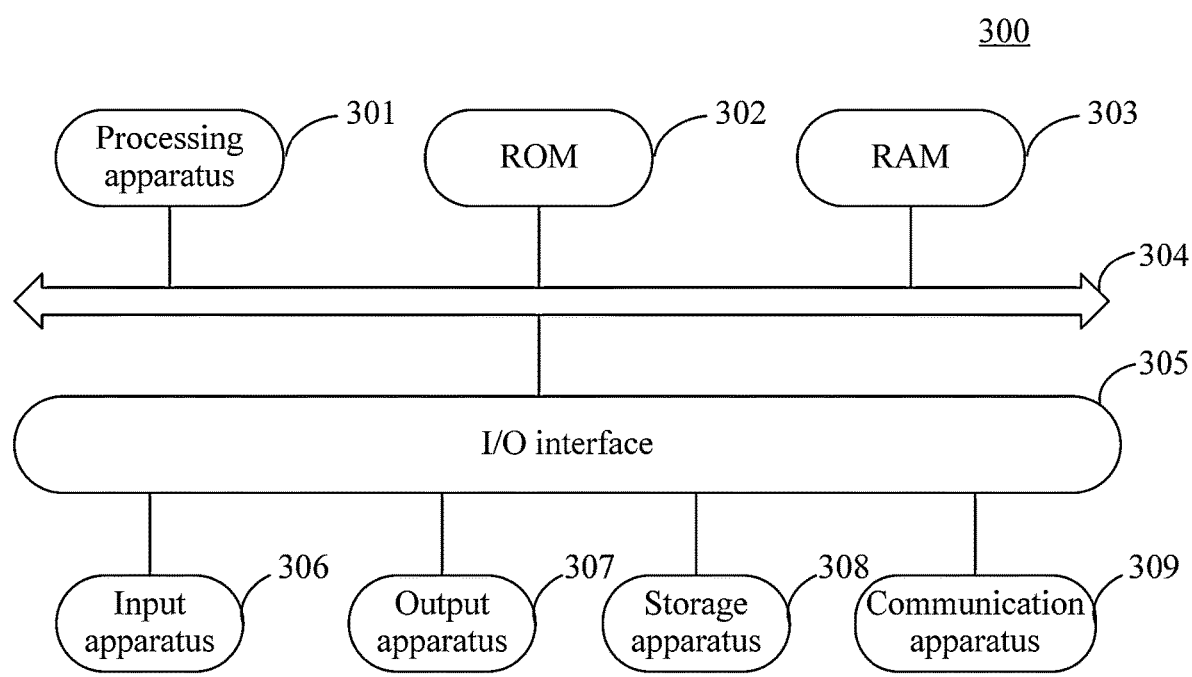
FIG. 8 is a structure diagram of an electronic device according to an embodiment of the present disclosure.

With reference to FIG. 8, FIG. 8 shows a structure diagram of an electronic device 300 suitable for implementing the embodiments of the present disclosure. The electronic device 300 in the embodiments of the present disclosure may include, but is not limited to, a mobile terminal such as a mobile phone, a laptop, a digital broadcast receiver, a personal digital assistant (PDA), a portable android device (PAD), a portable media player (PMP) and a vehicle-mounted terminal (such as a vehicle-mounted navigation terminal), a fixed terminal such as a digital television (TV) and a desktop computer, and various forms of servers such as a stand-alone server and a server cluster. The electronic device 300 shown in FIG. 8 is an example and is not intended to limit the function and usage scope of the embodiments of the present disclosure.

As shown in FIG. 8, the electronic device 300 may include a processing apparatus 301 (such as a central processing unit and a graphics processing unit) and may perform various types of appropriate operations and processing based on a program stored in a read-only memory (ROM) 302 or a program loaded from a storage apparatus 308 to a random-access memory (RAM) 303. Various programs and data required for the operation of the electronic device 300 are also stored in the RAM 303. The processing apparatus 301, the ROM 302, and the RAM 303 are connected to each other via a bus 304. An input/output (I/O) interface 305 is also connected to the bus 304.

Generally, the following apparatuses may be connected to the I/O interface 305: an input apparatus 306 such as a touch screen, a touchpad, a keyboard, a mouse, a camera, a microphone, an accelerometer and a gyroscope; an output apparatus 307 such as a liquid-crystal display (LCD), a speaker and a vibrator; the storage apparatus 308 such as a magnetic tape and a hard disk; and a communication apparatus 309. The communication apparatus 309 may allow the electronic device 300 to perform wireless or wired communication with other devices to exchange data. Although FIG. 8 shows the electronic device 300 having various apparatuses, not all of the apparatuses shown herein need to be implemented or presented. More or fewer apparatuses may alternatively be implemented or present.

According to the embodiments of the present disclosure, the processes described above with reference to the flowcharts may be implemented as computer software programs. For example, an embodiment of the present disclosure includes a computer program product. The computer program product includes a computer program carried in a computer-readable medium. The computer program includes program codes for performing the method for controlling a virtual avatar. In such an embodiment, the computer program may be downloaded from a network and installed through the communication apparatus 309, may be installed from the storage apparatus 308, or may be installed from the ROM 302. When the computer program is executed by the processing apparatus 301, the preceding functions defined in the method provided in the embodiments of the present disclosure are executed.

The preceding computer-readable medium in the present disclosure may be a computer-readable signal medium, a computer-readable storage medium or any combination thereof. The computer-readable storage medium, for example, may be, but is not limited to, an electronic, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a RAM, a ROM, an erasable programmable read-only memory (EPROM, or a flash memory), an optical fiber, a portable compact disk read-only memory (CD-ROM), an optical memory device, a magnetic memory device, or any appropriate combination thereof. In the present disclosure, the computer-readable storage medium may be any tangible medium that contains or stores a program for use by or in connection with an instruction execution system, apparatus, or device. In the present disclosure, the computer-readable signal medium may include a propagated data signal with computer-readable program code embodied therein, for example, in baseband or as part of a carrier wave. Such a propagated data signal may take any of a variety of forms, including, but not limited to, electro-magnetic, optical, or any appropriate combination thereof. The computer-readable signal medium may further be any computer-readable medium that is not a computer-readable storage medium and that can communicate, propagate, or transport a program for use by or in connection with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future-developed network protocol, such as HyperText Transfer Protocol (HTTP), and may be interconnected with any form or medium of digital data communication (such as a communication network). Examples of the communication network include a local area network (LAN), a wide area network (WAN), an internet (such as the Internet), and a peer-to-peer network (such as an ad hoc network), as well as any currently known or future-developed network.

The computer-readable medium may be included in the preceding electronic device or may exist alone without being assembled into the electronic device.

The computer-readable medium carries one or more programs that, when executed by the electronic device, cause the electronic device to: divide a virtual avatar into multiple skeleton chains, where each skeleton chain includes multiple skeleton points; acquire state information of at least one control point and initial state information of at least one skeleton point, where the state information includes location information and orientation information; determine movement information of at least one skeleton point based on the state information of the at least one control point and/or the initial state information of the at least one skeleton point, where the movement information includes translation information and/or rotation information; and control the at least one skeleton point whose movement information is determined to move according to the movement information.

Computer program codes for performing the operations in the present disclosure may be written in one or more programming languages or combinations thereof. The preceding programming languages include, but are not limited to, object-oriented programming languages such as Java, Smalltalk and C++, and also include conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any kind of network including a LAN or a WAN, or may be connected to an external computer (for example, via the Internet through an Internet service provider).

The flowcharts and block diagrams in the drawings illustrate system architectures, functions, and operations possibly implemented by the system, method, and computer program product of various embodiments of the present disclosure. In this regard, each block in the flowcharts or block diagrams may represent a module, a program segment, or part of codes, where the module, program segment, or part of codes contains one or more executable instructions for implementing a prescribed logic function. It is also to be noted that in some alternative implementations, the functions noted in the blocks may occur out of the order noted in the drawings. For example, two successively expressed blocks actually may be executed substantially in parallel, or the blocks may sometimes be executed in a reverse order, depending on the functionality involved. It is also to be noted that each block in the block diagrams and/or flowcharts and a combination of blocks in the block diagrams and/or flowcharts may be implemented by special-purpose hardware-based systems that perform the specified functions or operations, or combinations of special-purpose hardware and computer instructions.

The units involved in the embodiments of the present disclosure may be implemented in a software manner or in a hardware manner. The name of a unit is not intended to limit the unit in a certain circumstance.

The functions described above herein may be executed, at least in part, by one or more hardware logic components. For example, and without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD), and the like.

In the context of the present disclosure, the machine-readable medium may be a tangible medium that may include or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a RAM, a ROM, an EPROM or a flash memory, an optical fiber, a CD-ROM, an optical memory device, a magnetic memory device, or any appropriate combination thereof.

According to one or more embodiments of the present disclosure, a method and apparatus for controlling a virtual avatar is provided and includes the following steps.

A virtual avatar is divided into multiple skeleton chains, where each skeleton chain includes multiple skeleton points.

State information of at least one control point and initial state information of at least one skeleton point are acquired, where the state information includes location information and orientation information.

Movement information of at least one skeleton point is determined based on the state information of the at least one control point and/or the initial state information of the at least one skeleton point, where the movement information includes translation information and/or rotation information.

The at least one skeleton point whose movement information is determined is controlled to move according to the movement information.

According to one or more embodiments of the present disclosure, the multiple skeleton chains include a torso skeleton chain, two arm skeleton chains, and two leg skeleton chains, where the torso skeleton chain includes a head skeleton point and multiple torso skeleton points, each arm skeleton chain includes a shoulder skeleton point, an upper arm skeleton point, an elbow skeleton point, a forearm skeleton point, and a wrist skeleton point, and each leg skeleton chain includes a thigh skeleton point, a knee skeleton point, and an ankle skeleton point; and the at least one control point includes at least one of: a hand control point or a head control point.

According to one or more embodiments of the present disclosure, for the multiple torso skeleton points, the step where the movement information of at least one skeleton point is determined based on the state information of the at least one control point and/or the initial state information of the at least one skeleton point includes the following steps.

A target orientation of a chest skeleton point is determined according to state information of the hand control point and initial state information of the shoulder skeleton point.

Torso rotation information is determined according to the target orientation of the chest skeleton point and an initial orientation of the chest skeleton point.

First rotation information of the multiple torso skeleton points is determined according to the torso rotation information.

According to one or more embodiments of the present disclosure, the step where the first rotation information of the multiple torso skeleton points is determined according to the torso rotation information includes the following steps.

A rotation ratio of each torso skeleton point is acquired.

First rotation information corresponding to each torso skeleton point is determined according to the rotation ratio and the torso rotation information.

The step where the at least one skeleton point whose movement information is determined is controlled to move according to the movement information includes the following step.

The multiple torso skeleton points are controlled to rotate according to the first rotation information.

According to one or more embodiments of the present disclosure, for the head skeleton point, the step where the movement information of at least one skeleton point is determined based on the state information of the at least one control point and/or the initial state information of the at least one skeleton point includes the following step.

Movement information of the head skeleton point is determined based on state information of the head control point and initial state information of the head skeleton point.

The step where the at least one skeleton point whose movement information is determined is controlled to move according to the movement information includes the following step.

The head skeleton point is controlled to move according to the movement information of the head skeleton point.

According to one or more embodiments of the present disclosure, after the head skeleton point is controlled to move according to the movement information of the head skeleton point, the method further includes the following steps.

Target location information of a moved head skeleton point and initial location information of a root skeleton point are acquired.

Movement information of remaining torso skeleton points is determined using a first set algorithm based on the target location information and the initial location information.

The step where the at least one skeleton point whose movement information is determined is controlled to move according to the movement information includes the following step.

The remaining torso skeleton points are controlled to move according to the movement information.

According to one or more embodiments of the present disclosure, for the shoulder skeleton point on the arm skeleton chain, the step where the movement information of at least one skeleton point is determined based on the state information of the at least one control point and/or the initial state information of the at least one skeleton point includes the following step.

A target orientation of the shoulder skeleton point is determined based on location information of the hand control point and initial location information of the shoulder skeleton point.

The step where the at least one skeleton point whose movement information is determined is controlled to move according to the movement information includes the following step.

The shoulder skeleton point is controlled to rotate to the target orientation.

According to one or more embodiments of the present disclosure, the step where the target orientation of the shoulder skeleton point is determined based on the location information of the hand control point and the initial location information of the shoulder skeleton point includes the following steps.

A vector from the shoulder skeleton point to the hand control point is projected onto three plane surfaces of a global coordinate system.

Rotation angles of the shoulder skeleton point about three axes of the global coordinate system are determined according to a projected vector to obtain the target orientation.

According to one or more embodiments of the present disclosure, after the rotation angles of the shoulder skeleton point about three axes of the global coordinate system are determined according to a projected line, the method further includes the following steps.

Constraint information of the target orientation is acquired.

The target orientation is adjusted based on the constraint information to obtain an adjusted target orientation.

According to one or more embodiments of the present disclosure, after the rotation angles of the shoulder skeleton point about three axes of the global coordinate system are determined according to a projected line, the method further includes the following step.

If the rotation angle exceeds a set value, the rotation angle is multiplied by a length of the projected vector to obtain a corrected rotation angle.

According to one or more embodiments of the present disclosure, after the shoulder skeleton point is controlled to rotate to the target orientation, the method further includes the following steps.

Target plane surface information of an arm is determined.

A target location of the elbow skeleton point is determined using a second set algorithm based on the target plane surface information, initial location information of the upper arm skeleton point, and the location information of the hand control point.

The elbow skeleton point is controlled to move to the target location.

According to one or more embodiments of the present disclosure, the target plane surface information is represented by normal information, and the step where the target plane surface information of an arm is determined includes the following steps.

An elbow target orientation is determined according to a first upper arm direction, a second upper arm direction, an elbow initial orientation, and an orientation of the hand control point.

The target plane surface information of the arm is determined according to the elbow target orientation and the second upper arm direction.

According to one or more embodiments of the present disclosure, the step where the elbow target orientation is determined according to the first upper arm direction, the second upper arm direction, the elbow initial orientation, and the orientation of the hand control point includes the following steps.

A rotation angle from the first upper arm direction to the second upper arm direction is acquired.

An elbow intermediate orientation is determined based on the rotation angle and the elbow initial orientation.

The elbow target orientation is determined based on the elbow intermediate orientation and the orientation of the hand control point.

According to one or more embodiments of the present disclosure, after the elbow skeleton point is controlled to move to the target location, the method further includes the following steps.

First orientation information of a moved wrist skeleton point is acquired.

Second rotation information is determined according to the first orientation information and orientation information of the hand control point.

The elbow skeleton point, the forearm skeleton point, and the wrist skeleton point are controlled to rotate according to the second rotation information.

According to one or more embodiments of the present disclosure, the step where the elbow skeleton point, the forearm skeleton point, and the wrist skeleton point are controlled to rotate according to the second rotation information includes the following steps.

Swing-twist decomposition is performed on the second rotation information to obtain a swing component and a twist component.

The twist component is assigned to the elbow skeleton point, the forearm skeleton point, and the wrist skeleton point in predetermined ratios, and the swing component is assigned to the wrist skeleton point.

The elbow skeleton point and the forearm skeleton point are controlled to rotate according to an assigned twist component, and the wrist skeleton point is controlled to rotate according to the assigned twist component and an assigned swing component.

According to one or more embodiments of the present disclosure, for the leg skeleton point, the step where the movement information of at least one skeleton point is determined based on the state information of the at least one control point and/or the initial state information of the at least one skeleton point includes the following steps.

A movement mode of the virtual avatar is determined according to location information of the head control point.

If the movement mode of the virtual avatar is walking, a moving direction and a moving speed of the virtual avatar are determined.

Initial movement information of each of multiple skeleton points on the leg skeleton chain in a set animation is acquired according to the moving direction.

The initial movement information is adjusted based on the moving speed to obtain target movement information.

The step where the at least one skeleton point whose movement information is determined is controlled to move according to the movement information includes the following step.

The multiple skeleton points on the leg skeleton chain are controlled to move according to the target movement information.

According to one or more embodiments of the present disclosure, if the movement mode of the virtual avatar is jumping or squatting, target location information of the thigh skeleton point and target location information of the ankle skeleton point are determined.

Target location information of the knee skeleton point is determined using a third set algorithm based on the target location information of the thigh skeleton point and the target location information of the ankle skeleton point.

The step where the at least one skeleton point whose movement information is determined is controlled to move according to the movement information includes the following step.

The knee skeleton point is controlled to move to the target location.

Various forms of the flows shown above may be used, with steps re-ordered, added, or removed. For example, the steps described in the present disclosure may be executed in parallel, in sequence, or in a different order as long as the desired results of the solutions provided in the present disclosure are achieved. The execution sequence of these steps is not limited herein.

What is claimed is:

1. A method for controlling a virtual avatar, comprising:
dividing a virtual avatar into a plurality of skeleton chains; wherein each of the plurality of skeleton chains comprises a plurality of skeleton points;
acquiring state information of control points and initial state information of at least one skeleton point; wherein the state information comprises location information and orientation information;
determining movement information of at least one skeleton point based on at least one of the state information of the control points or the initial state information of the at least one skeleton point; wherein the movement information comprises at least one of translation information or rotation information; and
controlling the at least one skeleton point whose movement information is determined to move according to the movement information;
wherein the plurality of skeleton chains comprise a torso skeleton chain, two arm skeleton chains, and two leg skeleton chains, wherein the torso skeleton chain comprises a head skeleton point and a plurality of torso skeleton points, each of the two arm skeleton chains comprises a shoulder skeleton point, an upper arm skeleton point, an elbow skeleton point, a forearm skeleton point, and a wrist skeleton point, and each of the two leg skeleton chains comprises a thigh skeleton point, a knee skeleton point, and an ankle skeleton point; and the control points comprise two hand control points; and
wherein for the plurality of torso skeleton points, determining the movement information of the at least one skeleton point based on the at least one of the state information of the control points or the initial state information of the at least one skeleton point comprises:
determining two directions from two shoulder skeleton points of the two arm skeleton chains to the two hand control points respectively corresponding to the two shoulder skeleton points according to location information of the two shoulder skeleton points and location information of the two hand control points, and adding vectors corresponding to the two directions to obtain a direction vector corresponding to a target orientation of a chest skeleton point so as to determine the target orientation of the chest skeleton point;
determining torso rotation information according to the target orientation of the chest skeleton point and an initial orientation of the chest skeleton point; and
determining first rotation information of the plurality of torso skeleton points according to the torso rotation information.

2. The method according to claim 1, wherein determining the first rotation information of the plurality of torso skeleton points according to the torso rotation information comprises:
acquiring a rotation ratio of each of the plurality of torso skeleton points; and
determining first rotation information corresponding to each of the plurality of torso skeleton points according to the rotation ratio and the torso rotation information; and
wherein controlling the at least one skeleton point whose movement information is determined to move according to the movement information comprises:
controlling the plurality of torso skeleton points to rotate according to the first rotation information.

3. The method according to claim 2, wherein for the shoulder skeleton point on each of the two arm skeleton chains, determining the movement information of the at least one skeleton point based on the at least one of the state information of the at least one control points or the initial state information of the at least one skeleton point comprises:
determining a target orientation of the shoulder skeleton point based on location information of a corresponding hand control point and initial location information of the shoulder skeleton point; and
wherein controlling the at least one skeleton point whose movement information is determined to move according to the movement information comprises:
controlling the shoulder skeleton point to rotate to the target orientation of the shoulder skeleton point.

4. The method according to claim 1,
wherein the control points further comprise a head control point;
wherein for the head skeleton point, determining the movement information of the at least one skeleton point based on the at least one of the state information of the at least one control points or the initial state information of the at least one skeleton point comprises:
determining movement information of the head skeleton point based on state information of the head control point and initial state information of the head skeleton point; and
wherein controlling the at least one skeleton point whose movement information is determined to move according to the movement information comprises:
controlling the head skeleton point to move according to the movement information of the head skeleton point.

5. The method according to claim 2, after the controlling the head skeleton point to move according to the movement information of the head skeleton point, further comprising:
acquiring target location information of a moved head skeleton point and initial location information of a root skeleton point; and determining movement information of remaining torso skeleton points using a first set algorithm based on the target location information and the initial location information; and wherein controlling the at least one skeleton point whose movement information is determined to move according to the movement information further comprises:

controlling the remaining torso skeleton points to move according to movement information of the plurality of torso skeleton points.

6. The method according to claim 1, wherein for the shoulder skeleton point on each of the two arm skeleton chains, determining the movement information of the at least one skeleton point based on the at least one of the state information of the control points or the initial state information of the at least one skeleton point comprises:

determining a target orientation of the shoulder skeleton point based on location information of a corresponding hand control point and initial location information of the shoulder skeleton point; and wherein controlling the at least one skeleton point whose movement information is determined to move according to the movement information comprises:

controlling the shoulder skeleton point to rotate to the target orientation of the shoulder skeleton point.

7. The method according to claim 6, wherein determining the target orientation of the shoulder skeleton point based on the location information of the corresponding hand control point and the initial location information of the shoulder skeleton point comprises:

projecting a vector from the shoulder skeleton point to the corresponding hand control point onto three plane surfaces of a global coordinate system; and determining rotation angles of the shoulder skeleton point about three axes of the global coordinate system according to a projected vector to obtain the target orientation.

8. The method according to claim 7, after determining the rotation angles of the shoulder skeleton point about the three axes of the global coordinate system according to the projected vector, further comprising:

acquiring constraint information of the target orientation of the shoulder skeleton point; and adjusting the target orientation based on the constraint information to obtain an adjusted target orientation of the shoulder skeleton point.

9. The method according to claim 7, after determining the rotation angles of the shoulder skeleton point about the three axes of the global coordinate system according to the projected vector, further comprising:

in a case where one of the rotation angles of the shoulder skeleton point exceeds a set value, multiplying the one of the rotation angles of the shoulder skeleton point by a length of the projected vector to obtain a corrected rotation angle.

10. The method according to claim 6, after controlling the shoulder skeleton point to rotate to the target orientation of the shoulder skeleton point, further comprising:

determining target plane surface information of an arm;

determining a target location of the elbow skeleton point using a second set algorithm based on the target plane surface information, initial location information of the upper arm skeleton point, and the location information of the two hand control points; and controlling the elbow skeleton point to move to the target location of the shoulder skeleton point.

11. The method according to claim 10, wherein the target plane surface information is represented by normal information; determining the target plane surface information of the arm comprises:

determining an elbow target orientation according to a first upper arm direction, a second upper arm direction, an elbow initial orientation, and an orientation of the two hand control points; and determining the target plane surface information of the arm according to the elbow target orientation and the second upper arm direction.

12. The method according to claim 11, wherein determining the elbow target orientation according to the first upper arm direction, the second upper arm direction, the elbow initial orientation, and the orientation of the two hand control points comprises:

acquiring a rotation angle from the first upper arm direction to the second upper arm direction;

determining an elbow intermediate orientation based on the rotation angle and the elbow initial orientation; and determining the elbow target orientation based on the elbow intermediate orientation and the orientation of the two hand control points.

13. The method according to claim 10, after controlling the elbow skeleton point to move to the target location, further comprising:

acquiring first orientation information of a moved wrist skeleton point;

determining second rotation information according to the first orientation information and orientation information of the two hand control points; and controlling the elbow skeleton point, the forearm skeleton point, and the wrist skeleton point to rotate according to the second rotation information.

14. The method according to claim 13, wherein controlling the elbow skeleton point, the forearm skeleton point, and the wrist skeleton point to rotate according to the second rotation information comprises:

performing swing-twist decomposition on the second rotation information to obtain a swing component and a twist component;

assigning the twist component to the elbow skeleton point, the forearm skeleton point, and the wrist skeleton point in predetermined ratios, and assigning the swing component to the wrist skeleton point; and controlling the elbow skeleton point and the forearm skeleton point to rotate according to an assigned twist component, and controlling the wrist skeleton point to rotate according to the assigned twist component and an assigned swing component.

15. The method according to claim 1, wherein the control points further comprise a head control point;

wherein for each of the two leg skeleton chains, determining movement information of the at least one skeleton point based on the at least one of the state information of the control points or the initial state information of the at least one skeleton point comprises:

determining a movement mode of the virtual avatar according to location information of the head control point;

in a case where the movement mode of the virtual avatar is walking, determining a moving direction and a moving speed of the virtual avatar;

acquiring initial movement information of a plurality of skeleton points on the each of the leg skeleton chains in a set animation according to the moving direction; and adjusting the initial movement information based on the moving speed to obtain target movement information; and wherein controlling the at least one skeleton point whose movement information is determined to move according to the movement information comprises:

controlling the plurality of skeleton points on the each of the leg skeleton chains to move according to the target movement information.

16. The method according to claim 15, further comprising:

in a case where the movement mode of the virtual avatar is jumping or squatting, determining target location information of the thigh skeleton point and target location information of the ankle skeleton point; and determining target location information of the knee skeleton point using a third set algorithm based on the target location information of the thigh skeleton point and the target location information of the ankle skeleton point; and wherein controlling the at least one skeleton point whose movement information is determined to move according to the movement information further comprises:

controlling the knee skeleton point to move to a target location.

17. An electronic device, comprising:

at least one processing apparatus; and a storage apparatus, which is configured to store at least one program;

wherein the at least one program, when executed by the at least one processing apparatus, enables the at least one processing apparatus to perform a method for controlling a virtual avatar, wherein the method for controlling the virtual avatar comprises:

dividing a virtual avatar into a plurality of skeleton chains; wherein each of the plurality of skeleton chains comprises a plurality of skeleton points;

acquiring state information of control points and initial state information of at least one skeleton point; wherein the state information comprises location information and orientation information;

determining movement information of at least one skeleton point based on at least one of the state information of the control points or the initial state information of the at least one skeleton point; wherein the movement information comprises at least one of translation information or rotation information; and controlling the at least one skeleton point whose movement information is determined to move according to the movement information;

wherein the plurality of skeleton chains comprise a torso skeleton chain, two arm skeleton chains, and two leg skeleton chains, wherein the torso skeleton chain comprises a head skeleton point and a plurality of torso skeleton points, each of the two arm skeleton chains comprises a shoulder skeleton point, an upper arm skeleton point, an elbow skeleton point, a forearm skeleton point, and a wrist skeleton point, and each of the two leg skeleton chains comprises a thigh skeleton point, a knee skeleton point, and an ankle skeleton point; and the control points comprise two hand control points; and wherein for the plurality of torso skeleton points, determining the movement information of the at least one skeleton point based on the at least one of the state information of the control points or the initial state information of the at least one skeleton point comprises:

determining two directions from two shoulder skeleton points of the two arm skeleton chains to the two hand control points respectively corresponding to the two shoulder skeleton points according to location information of the two shoulder skeleton points and location information of the two hand control points, and adding vectors corresponding to the two directions to obtain a direction vector corresponding to a target orientation of a chest skeleton point so as to determine the target orientation of the chest skeleton point;

determining torso rotation information according to the target orientation of the chest skeleton point and an initial orientation of the chest skeleton point; and determining first rotation information of the plurality of torso skeleton points according to the torso rotation information.

18. A non-transitory computer-readable medium storing a computer program, wherein the computer program, when executed by a processing apparatus, performs a method for controlling a virtual avatar, wherein the method for controlling the virtual avatar comprises:

dividing a virtual avatar into a plurality of skeleton chains; wherein each of the plurality of skeleton chains comprises a plurality of skeleton points;

acquiring state information of control points and initial state information of at least one skeleton point; wherein the state information comprises location information and orientation information;

determining movement information of at least one skeleton point based on at least one of the state information of the control points or the initial state information of the at least one skeleton point; wherein the movement information comprises at least one of translation information or rotation information; and controlling the at least one skeleton point whose movement information is determined to move according to the movement information;

wherein the plurality of skeleton chains comprise a torso skeleton chain, two arm skeleton chains, and two leg skeleton chains, wherein the torso skeleton chain comprises a head skeleton point and a plurality of torso skeleton points, each of the two arm skeleton chains comprises a shoulder skeleton point, an upper arm skeleton point, an elbow skeleton point, a forearm skeleton point, and a wrist skeleton point, and each of the two leg skeleton chains comprises a thigh skeleton point, a knee skeleton point, and an ankle skeleton point; and the control points comprise two hand control points;

wherein for the plurality of torso skeleton points, determining the movement information of the at least one skeleton point based on the at least one of the state information of the control points or the initial state information of the at least one skeleton point comprises:

determining two directions from two shoulder skeleton points of the two arm skeleton chains to the two hand control points respectively corresponding to the two shoulder skeleton points according to location information of the two shoulder skeleton points and location information of the two hand control points, and adding vectors corresponding to the two directions to obtain a direction vector corresponding to a target orientation of a chest skeleton point so as to determine the target orientation of the chest skeleton point;

determining torso rotation information according to the target orientation of the chest skeleton point and an initial orientation of the chest skeleton point; and determining first rotation information of the plurality of torso skeleton points according to the torso rotation information.

* * * * *